B. Atwater
Fly Trap
Nº 21,646.  Patented Oct. 5, 1858.
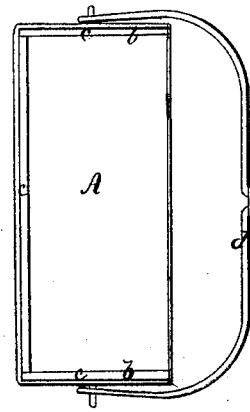
Fig. 1.
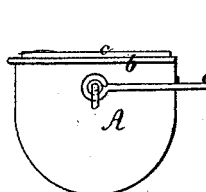
Fig. 2.
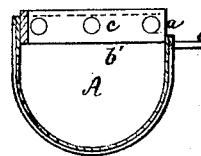
Fig. 3.
Fig. 4.

UNITED STATES PATENT OFFICE.

BRYAN ATWATER, OF BERLIN, CONNECTICUT.

FLY-TRAP.

Specification of Letters Patent No. 21,646, dated October 5, 1858.

*To all whom it may concern:*

Be it known that I, BRYAN ATWATER, of Berlin, in the county of Hartford and State of Connecticut, have invented a new and useful Fly-Catcher; and I do hereby declare that the same is fully described and represented in the following specification and the accompanying drawings, of which—

Figure 1, is a top view, Fig. 2, a side elevation, and Fig. 3, a longitudinal section of the said catcher. Fig. 4, is an inner side view of the suds reservoir thereof.

In carrying out my invention I employ a suds reservoir or vessel A, made in the form of a deep trough as shown in the drawings and having one side notched or provided with its top arranged at about one third of an inch below the upper edges of the two ends and the other side so as to form a passage, $a$, extending from one end, $b$, to the other, $b$, (or thereabout) of the trough. This trough may be made of tinned iron or other suitable material. To prevent it, when in use from scratching or injuring a ceiling or making a noise to friction thereon, it may have a strip of rubber or leather, $c$, or the equivalent thereof fastened along its upper edges so as to project a short distance therefrom and rest against the ceiling when the reservoir is placed or held up to the same. This reservoir, as a general thing, is to be attached to a handle B, in such manner as to enable it to be held up to, and moved on a ceiling of a room with its mouth against the same. As a convenient mode of applying it to a handle and so as to enable it to readily adjust itself to the ceiling, the handle may be bifurcated as shown at $d$, each prong of the fork being jointed to the reservoir in such manner and above its center of gravity as to enable the said reservoir to swing or vibrate freely within the fork. By such a mode of applying the handle to the reservoir, the latter will be maintained in close connection with the ceiling simply by the upward pressure which may be exerted on the handle.

Preparatory to using this article or fly catcher for the purpose of taking flies or removing them from the ceiling of a room, its reservoir should be supplied with a liquid, strong soap suds being what is peculiarly useful as the froth of the suds greatly facilitates the operation of catching the flies or insects whatever they may be, as my device is applicable to the taking of many other insects, as well as house flies. Having thus prepared the fly catcher, the time for operating with it to the best advantage is when the room is darkened and the flies or insects are at rest on the ceiling. Under these circumstances if the catcher be pressed up to the ceiling and moved gently along the same with its opening, $a$, presented toward the flies to be taken, they will be brought within the reservoir and will be scraped off the ceiling and caused to fall into the froth of the suds and from thence into the liquid below the same.

I claim—

As a new thing or manufacture, a fly catcher constructed with the notch or passage, $a$, arranged with respect to the upper edges of its side and two ends and so as to operate substantially as described under circumstances as specified.

In testimony whereof, I have hereunto set my signature.

BRYAN ATWATER.

Witnesses:
R. H. EDDY,
F. P. HALE, Jr.